Patented May 24, 1949

2,471,234

UNITED STATES PATENT OFFICE 2,471,234

METHYLPENTADIENE-ARALKENYL COPOLYMERS

Rupert C. Morris, Berkeley, Alva V. Snider, Richmond, and Eugene T. Bishop, Berkeley, Calif., assignors to Shell Development Company, San Francisco, Calif., a corporation of Delaware No Drawing. Application June 15, 1944, Serial No. 540,548

9 Claims. (Cl. 260—83.7)

1

This invention relates to co-polymers of branch-chain 1,3-hexadienes with aromatic olefin hydrocarbons.

Valuable synthetic elastomers can be produced by the polymerization of 1,3-butadiene, preferably in the presence of acrylonitrile or styrene. These elastomers have numerous disadvantages, including lack of tack, absence of elastic limit, excessive nerve, shortness in milling, and insufficient solubility in cheap organic solvents. Elastomers having improved solubility and tack can be produced by the polymerization of branch-chain 1,3-hexadienes. Crude homopolymers of these latter dienes may be so soft that milling, compounding and handling are difficult. Previously prepared co-polymers of the branch-chain 1,3-hexadienes have been improved variously in one or more properties but impaired in others.

We have now discovered that synthetic elastomers which more closely resemble natural rubber in milling and fabricating properties than do any other synthetic elastomers of which we are aware can be produced by co-polymerizing a branch-chain 1,3-hexadiene having a straight chain of 5 carbon atoms with a small amount of an aromatic olefin hydrocarbon. Elastomers can be produced which have a higher molecular weight, a higher Mooney plasticity and more pronounced elastic limit than the corresponding homopolymers produced under otherwise identical conditions. Comparable products cannot be obtained by the homopolymerization or co-polymerization of other dienes, so far as we are aware.

The methylpentadienes with which the invention is concerned are branch-chain 1,3-hexadienes having a straight chain of 5 carbon atoms, specifically, 2-methyl-1,3-pentadiene, 3-methyl-1,3-pentadiene and 4-methyl-1,3-pentadiene. A single methylpentadiene can be polymerized alone or two or more methylpentadienes can be polymerized in admixture with one another. It is preferred to employ a mixture of 2-methyl-1,3-pentadiene and 4-methyl-1,3-pentadiene, e. g. a mixture of about 85% of 2-methyl-1,3-pentadiene with about 15% of 4-methyl-1,3-pentadiene, such as may be produced by the dehydration of 2-methyl-2,4-pentanediol.

The aromatic olefin hydrocarbons used in co-polymerization in accordance with the invention are derivatives of olefins, in which one of the hydrogen atoms of the olefin has been substituted by an aromatic radical. Preferred compounds have an aromatic radical of which one aromatic ring carbon atom is attached directly by a single bond to a carbon atom which in turn is attached

2 directly by an olefinic double bond to another aliphatic carbon atom. The aromatic radical may have but a single aromatic ring, or it may have two or more aromatic rings, which may or may not be condensed. The compound may have one or a plurality of olefinic double bonds. Preferred compounds are free from polymerizable aliphatic carbon-to-carbon unsaturation conjugated with respect to carbon and capable of 1,4-polymerization. Representative examples of suitable aromatic olefin hydrocarbons are styrene, alpha-methyl styrene, vinylnaphthalene, etc. Many others are suitable. The compounds may or may not contain substituents such as halogen, nitro, etc.

Some of these co-polymerizing agents reduce the rate of polymerization of the diene and present operational difficulties. Co-polymerization with styrene in the presence of Friedel-Crafts catalysts, for instance, is considerably slower than the corresponding homopolymerization and the styrene tends to crystallize out of solution in liquid ethylene, making the addition of other solvents desirable. Because these difficulties are not encountered with alpha-methyl styrene, and because of the exceptionally desirable properties of the resulting elastomers, co-polymerization with alpha-methyl styrene is preferred.

A single aromatic olefin hydrocarbon may be co-polymerized with a single branch-chain 1,3-hexadiene; or two or more aromatic olefin hydrocarbons may be co-polymerized with a single branch-chain 1,3-hexadiene; or one, two or more aromatic olefin hydrocarbons may be co-polymerized with two or more branch-chain hexadienes. In general, preferred co-polymers consist of the co-polymerization products of the aforesaid dienes with the aforesaid aromatic olefin hydrocarbons, in the substantial absence of other polymerizable unsaturated compounds.

The ratio of aromatic olefin reactants to hexadiene reactants may be varied over a wide range. In all cases, however, the ratio should be less than 1:1 by weight, since with higher ratios products which are plastics, rather than elastomers, are obtained. In general, as the ratio increases the low-temperature flexibility of the product (as measured by the brittle point) decreases. Products produced from reactants in the higher range of ratios, e. g. above about 1:10, may be too brittle for use in tire treads, tire tubes, footwear, raincoats, outdoor electrical insulation, etc., except, perhaps, with the addition of suitable modifying agents. It has been discovered, however, that the use of only a very small amount of aromatic olefin co-polymerizate, e. g. from about 0.1% to about 5% by weight of the total of aromatic olefin and hexadiene reactants, brings about a remarkable improvement in milling and compounding properties without seriously impairing low temperature flexibility. It is preferred to use about 2% of aromatic olefin reactants by weight of the total.

Co-polymerization may be effected in any suitable manner. Co-polymerization in aqueous emulsion with persulfates, perborates, peroxides or other "per" compounds, preferably at between about 40° C. and 60° C., is satisfactory, although the rate and yields are low. Higher yields and faster polymerization can be obtained with diazoaminoaryl compounds such as diazoaminobenzene as catalysts at temperatures above about 75° C., preferably about 90° C. Emulsifying agents, protective colloids, regulating agents and the like may be present. Polymers so produced may be slightly discolored but can be decolorized by sufficient washing.

Co-polymerization in the presence of a Friedel-Crafts catalyst is particularly desirable for the purposes of the present invention, since in this way color-stable polymers are readily obtained. Friedel-Crafts polymerization is faster and produces products of improved elastic limit effect. Friedel-Crafts catalysts which may be employed include boron trifluoride and hydrolyzable metallic halides such as stannic chloride, aluminum chloride, zinc chloride, ferric chloride, titanium tetrachloride, antimony pentachloride, etc. Other Friedel-Crafts catalysts are described by Calloway in Chem. Rev., 17, 327 (1925). Stannic chloride is liquid and is readily soluble in the methylpentadienes, even at low temperatures. For this and other reasons stannic chloride is the preferred catalyst. The metallic halides are preferably added to the methylpentadienes in solution in an inert liquid such as methyl chloride, ethyl chloride and 2,4-dimethylsulfolane. Amounts of catalysts from about 0.2 to about 10 parts per 100 parts of polymerizable unsaturated compounds have been found satisfactory, although smaller or larger amounts may be used. Co-polymerization in the presence of Friedel-Crafts catalysts should be carried out under substantially anhydrous conditions.

With Friedel-Crafts catalysts the reactants may be polymerized in bulk in the absence of diluents. Ordinarily, however, the reaction proceeds more smoothly and products of improved homogeneity are obtained if an homogenizing agent is present. Preferred homogenizing agents are liquids which are solvents for both monomer and polymer under the conditions involved. Non-aromatic hydrocarbon and non-aromatic halogenated hydrocarbon liquids are suitable. Saturated and unsaturated solvents may be used. Examples of suitable solvents are ethane, propane, the butanes, the pentanes, etc.; ethylene, propylene, the butylenes, the pentylenes, etc.; butadiene, isoprene, etc.; methyl chloride, ethyl chloride, propyl chloride, etc. The olefins and di-olefins named do not appear appreciably to polymerize with stannic chloride as a catalyst at low temperatures, although in favorable cases a small amount of polymerization and/or interpolymerization with the methylpentadienes may occur. Many other substances are suitable as homogenizing agents. Ethers, alcohols and esters may be undesirable if they form complexes with the metallic halides involved. The amount of homogenizing agent used may be varied over a wide range, e. g. from about 10 parts to about 10,000 parts of homogenizing agent per 100 parts of the polymerizable unsaturated compounds employed, although the more narrow range of from about 70 parts to about 30 parts per 100 parts of the polymerizable compounds is preferred.

In Friedel-Crafts co-polymerization in accordance with the invention temperatures of below about −50° C. result in rubbery products characterized by an elastic limit. At more elevated temperatures the products have non-rubbery characteristics. Lower temperatures, e. g. −75° C. to −200° C. and even lower, may be employed. The temperature of the polymerization reaction mixture is preferably held substantially constant throughout the reaction. Wide variations result in inhomogeneous products. The temperature should not be allowed to rise substantially above the designated limits.

Polymerization by any of the suitable methods may be carried out in a continuous or batchwise manner. Atmospheric or superatmospheric pressures may be employed. In some cases subatmospheric pressures may be used. The reaction mixture may be blanketed with an inert fluid such as oxygen-free nitrogen or carbon dioxide, if desired. The mixture is preferably agitated during the reaction.

The co-polymers produced by any of the suitable methods are high molecular weight linear compounds. Preferred co-polymers have a molecular weight of above about 8,000. Such co-polymers which may be obtained by Friedel-Crafts polymerization at about −50° C. and below are rubbery and are preferred. Some of the co-polymers have molecular weights above 500,000.

The co-polymers of the invention may be isolated and purified in any suitable manner. In the case of emulsion polymerization, the emulsion may be broken by freezing or by the addition of an electrolyte. The precipitated co-polymer may be separated by filtration, centrifuging or the like, washed and dried. The co-polymer may be further purified by treatment, e. g. boiling with dilute caustic, which removes fatty acids and other contaminants which may be present.

In the case of polymer produced under Friedel-Crafts catalysis in the absence of a diluent it may be sufficient merely to wash with water to destroy and remove the catalyst. Polymer produced in the presence of a solvent may be precipitated by admixture with a liquid in which the solvent is soluble but the polymer insoluble. Acetone is a suitable precipitating liquid. A residual solvent or other diluent may be removed by washing with a suitable organic liquid and/or with water.

The water or other liquid remaining in the product may usually be removed by evaporation, if desired, at elevated temperatures and under reduced pressures. Washing and/or subsequent drying may be facilitated by mastication on corrugated rolls in the manner known in the rubber industries.

The co-polymers may be compounded with modifying substances such as those used with natural rubber. Compounding can be done in a Banbury mixer or on a roll mill, the desired substances being added, usually one at a time, as fast as efficient blending with the stock and the maintenance of operable working consistency permit. Representative examples of plasticizers which may be used are: wood rosin, gum rosin, ester gum, alkyd resins, phenol-aldehyde resins, shellac, dibutyl sebacate, dibutyl phthalate, dicapryl phthalate, dioctyl phthalate, allyl 3-sulfolanyl ether, coal tar, cumarone resins, tricresyl phosphate, chlorinated tricresyl phosphate, alkoxy alkyl phosphates, tributoxy ethyl phosphate, dibenzyl ether, triacetin, stearic acid, lauric acid, aromatic high molecular weight petroleum fractions, etc. Other plasticizers are suitable. Chemical plasticizers may be used.

Tackifiers may be present. Among the common tackifiers are higher unsaturated cyclic ketones and hydrogenation products thereof, resins produced by reacting higher ketones with aldehydes, and hydrocarbon substances of the type exemplified by the trade-mark "Naftolen," i. e., unsaturated hydrocarbons having a boiling point of from 200° C. to 300° C. obtained from acid petroleum sludge.

Antioxidants may be present. The most common antioxidant is phenyl beta-naphthyl amine. Other antioxidants include para-hydroxy diphenyl, hydro-quinone, para-amino phenol, para,para'-diamino diphenylmethane, 2,4-n-toluylene diamine, diphenylamine, ortho-ditolylamine, para-ditolylamine, phenyl alpha-naphthyl amine, phenyl beta-naphthyl nitrosoamine, sym-di-beta-naphthyl para-phenylene diamine, diphenyl diamino ethane and 2,4-diaminodiphenylamine.

Carbon black and other fillers and pigments may be present. In tire manufacture channel black is the preferred reinforcing pigment. Semi-reinforcing black, thermatomic black, acetylene black and the like may be used. Mineral pigments such as clay, calcium silicate, iron oxide, calcium carbonate, zinc oxide, titanium dioxide, etc., may be used.

In the production of vulcanizable compositions, one or more vulcanizing agents are usually added. Sulfur is the preferred vulcanizing agent. Other agents used, generally with less success, are sulfur-containing compounds, such as sulfur dioxide, sulfur chloride, sulfur dichloride, hydrogen sulfide, thiuram disulfides, tetrasulfides and sulfur thiocyanate; oxygen and oxygen-yielding compounds, such as ozone, organic and inorganic peroxides; selenium, halogens and halogen-containing compounds, and; nitrogen-containing compounds, such as the nitrobenzenes.

Vulcanization accelerators may be present. Illustrative examples of accelerators are tetramethyl thiuram disulfide, zinc dibutyl dithiocarbamate, tetramethyl thiuram monosulfide, dipentamethylene thiuram tetrasulfide, mercapto benzo thiozole, hexamethylene-tetramine, aldehyde-ammonia, diphenylguanidine, diphenylthiourea, benzothiazyl disulfide, piperidinium pentamethylene-dithiocarbamate, di-o-tolylguanidine, triphenylguanidine and lead dimethyldithiocarbamate.

In addition to, or instead of, the modifiers already mentioned the compositions may contain dyes, stabilizers, lubricants, tackifiers, thickening agents, and the like. They may be mixed with plastic substances of many kinds, many of the plastics acting as plasticizers. Examples of plastic modifiers are natural resins, thermosetting condensation-type synthetic resins such as phenol-aldehyde, urea-aldehyde and many alkyd resins, resins produced by the polymerization and co-polymerization of unsaturated compounds such as those listed hereinabove, protein plastics, cellulose derivatives and the like. In some cases, the modifying plastics may be produced in situ in the presence of the present co-polymers. These and other modifiers may often be present during the polymerization reaction.

The co-polymers may be blended with natural, synthetic or reclaimed rubber. Small amounts of latex or crude rubber of Hevea or the like increase the adhesiveness of the compositions. Synthetic rubber modifiers include polymers of 1,3-butadiene, isoprene, piperylene, 2,3-dimethyl-1,3-butadine, chloroprene, the other 1,3-dienes, olefins such as isobutylene, co-polymers of 1,3-dienes with styrene, acrylonitrile and the like, co-polymers of isobutylene with a small amount of butadiene, high molecular weight polyesters, polyvinyl halides, olefin polysulfides and the like.

The co-polymers and compounded compositions containing them may be subjected to numerous shaping operations. Sheets may be produced by the use of roll mills such as calenders or, less usually by casting from solutions. Sheets, rods, tubes and coatings may be produced by continuous or discontinuous extrusion. Molded articles may be produced by operations using open or closed molds. The compositions may be applied to fibrous material such as fabric by calendering or by impregnation with a solution or emulsion.

Compositions containing a vulcanizing agent may be vulcanized at temperatures used in the vulcanization of natural rubber and of other elastomers, e. g. 50° C. to 200° C.

The new synthetic elastomers of the invention may be used for most of the purposes for which other synthetic and natural elastomers are used. They are valuable in the production of balloon coverings, umbrellas, raincoats, tents, table covers, shower curtains, garment bags, electrical insulation, friction tape, hose for the handling of aqueous mixtures, paints, etc., self-sealing fuel tanks, gaskets, belts for conveying and for the transmission of power, vibration dampeners, printers rolls, printers blankets, engraving plates, shoe soles and heels, aprons, gloves, gas masks, clothing resistant to the penetration of poisonous gases, tire tubes, tire casings and adhesives. They may be used as plasticizers and tackifiers.

The new co-polymers are particularly valuable in the production of pressure-sensitive adhesives. Transparent pressure-sensitive tape may comprise a layer of co-polymer adhesive upon a thin, transparent, flexible, non-fibrous film, which may be composed of one or more layers of regenerated cellulose, cellulose nitrate, cellulose acetate, cellulose acetate-butyrate, cellulose acetate-propionate, ethyl cellulose, rubber hydrochloride, cyclized rubber, polyvinyl chloride, polyvinylidene chloride, polyvinyl alcohol or the like. The adhesive layer may comprise plasticizers, tackifiers, etc., in addition to a suitable co-polymer.

Surgical adhesive tape may comprise fabric coated with a layer of a mixture of one or more of the co-polymers with plasticizers, tackifiers, fillers such as terra alba, etc.

The new co-polymers are of great value as adhesives, as well as primary material, in the construction of vehicle tires and of other articles comprising both fabric and an elastomer.

In fabricating operations involving the new co-polymers, particularly in using the new co-polymers as adhesives, it may be desirable to make use of liquid or semi-liquid solutions of the co-polymers in volatile solvents. Examples of suitable solvents are: hexane, pentane, isooctane, gasoline, "rubber solvent," cyclohexane, methyl-cyclohexane, chloroform, ethylene dichloride, trichloroethane, trichloroethylene, monochlorobenzene, monochlorotoluene, dichloropentanes, orthodichlorobenzene, 1,2,3-trichlorobutane, benzene, toluene, benzyl alcohol, phenyl ethyl alcohol, dibenzyl ether, phenyl ethyl ether, dioxane, dioxolane, methyl dioxolane, methyl cellosolve acetate, methyl acetate, ethyl acetate, isopropyl acetate, butyl acetate, ethyl oxalate, ethyl acetoacetate, benzyl benzoate, acetone, methyl ethyl ketone, diisopropyl ketone, methyl isobutyl ketone, and carbon tetrachloride.

The co-polymers of the invention are valuable additives for lubricating oils, greases, waxes and the like. Very small amounts, e. g. less than 10% by weight of the oil, of the higher molecular weight polymers (above about 50,000) serve as bodying agents and, particularly, improve the viscosity index of oils. The lower molecular weight polymers are similarly effective, although to a smaller degree. The term "viscosity index" (abbreviated "V. I.") refers to the comparative viscosity-temperature relationship as defined by Dean and Davis, in Chemical and Metallurgical Engineering, 36, 618 (1929).

Lubricating compositions can be produced by mixing the polymers with synthetic lubricants comprising polymerization products of unsaturated hydrocarbons, such as ethylene, the propylenes, the butylenes, etc. Suitable synthetic lubricants may also be produced by the Friedel-Crafts polymerization of selective hydrocarbon fractions obtained by cracking hydrocarbon waxes, etc. The polymethylpentadienes of the invention are valuable additives to other lubricating compositions and to oils used for other purposes.

Larger amounts of the polymers than are used as V. I. improvers may be employed with natural or synthetic lubricants in the production of plastic compositions useful as greases.

The employment of these polymers in lubricating compositions is not limited to their association with petroleum or mineral oils. They may also be used in animal or vegetable oils, such as lard oil, whale oil, cottonseed oil, castor oil, soya oil, phosphatides, e. g., lecithin, and the like. They may be used in roll oils, in tinning oils, as components of hydraulic fluids, launching grease, etc. They may be used in conjunction with asphalts and the like in the production of roadways, roofing compositions, caulking, etc.

The co-polymers can be subjected to hydrogenation, hydrochlorination, sulfonation, sulfurization, cyclization, etc. In many cases, co-polymers so treated are preferred over the untreated co-polymers for use in lubricants, paints, etc.

Some of the many ways in which the invention may be carried out are illustrated by the following examples in which parts are on a weight basis.

Example I

A mixture of 2 parts of alpha-methyl styrene with 98 parts of a mixture containing about 85% of 2-methyl-1,3-pentadiene and about 15% of 4-methyl-1,3-pentadiene was polymerized in solution in liquid ethylene at atmospheric pressure (about $-100°$ C.) in the presence of 2 parts of aluminum chloride. The co-polymer was precipitated as formed. The ethylene was allowed to evaporate, whereupon the co-polymer was washed with water and dried under reduced pressure. The purified co-polymer was water-white, transparent, tough and elastic. It exhibited a pronounced elastic limit effect. The Mooney plasticity was 80 at 60° C.

Example II

The co-polymer produced in Example I is mixed with plasticizer and tackifier, dissolved in gasoline, and applied to one side of a sheet of glycerol-plasticized regenerated cellulose. The coated side of the sheet is pressed against a smooth wood surface. A strong bond is obtained, but the coated sheet can be separated from the wood surface without offsetting of the adhesive.

Example III

The co-polymer produced in Example I was compounded in accordance with the following recipe:

| | Parts |
|---|---|
| Co-polymer | 100 |
| Carbon black (Spheron #9) | 50 |
| Plasticizer (Bardol B) | 5 |
| Zinc oxide | 5 |
| Sulfur | 2 |
| Mercaptobenzothiazole (Captax) | 1.5 |
| Tetramethylthiuram disulfide | 0.2 |
| Stearic acid | 1 |
| Antioxidant (Agerite) | 1 |

Vulcanizates were produced by heating at 145° C. for 30, 45, 60 and 90 minutes.

Example IV

Alpha-methyl styrene, 20 parts, was co-polymerized with 80 parts of a mixture of about 85% of 2-methyl-1,3-pentadiene with about 15% of 4-methyl-1,3-pentadiene in solution in a mixture of liquid isomeric pentanes at about $-75°$ C. under atmospheric pressure in the presence of 3% of stannic chloride. The co-polymer was worked up in accordance with Example I. The co-polymer was water-white and very flexible. It had remarkable film-forming and coating properties, ideally adapted for packaging material, particularly for use in the unplasticized condition for the protection of comestibles. The molecular weight of the co-polymer, as determined by viscosity measurements, was 75,000.

Example V

Styrene, 10 parts, was co-polymerized with 90 parts of a mixture of about 85% of 2-methyl-1,3-pentadiene with about 15% of 4-methyl-1,3-pentadiene in solution in liquid ethylene at about $-100°$ C. under atmospheric pressure in the presence of 3% of aluminum chloride. The rate of polymerization was less than in the case of the diene mixture without styrene, or of the diene mixture with alpha-methyl styrene in the same ratio, and the yield was less. The polymer had a molecular weight of 185,000, as determined by viscosity measurements.

Example VI

Alpha-methyl styrene, 10 parts, was co-polymerized with 90 parts of the diene mixture used in Examples I, IV and V in solution in liquid ethylene at about $-100°$ C. under atmospheric pressure in the presence of 3% of aluminum chloride. The purified, dry polymer was a water-white, tough elastomer having a Mooney plasticity of 92 at 60° C.

Example VII

A mixture of styrene, 25 parts, with 75 parts of the mixture of dienes used in Example I was emulsified in an aqueous phase consisting of water, 180 parts, Ivory soap, 5.1 parts and diazoaminobenzene, 1 part. The intial pH of the emulsion was 10.2. The emulsion was polymerized in a glass pressure vessel for 16 hours at 90° C. The final pH was 9.8. A yield of 96.4% was obtained. The milling properties of the co-polymer were judged "Excellent."

The co-polymer was compounded in accordance with the following recipe:

|  | Parts |
|---|---|
| Co-polymer | 100 |
| Carbon black (Spheron #9) | 50 |
| Plasticizer (Bardol B) | 5 |
| Zinc oxide | 5 |
| Sulfur | 2 |
| Mercaptobenzothiazole | 1.5 |
| Tetramethylthiuram disulfide | 0.4 |

After vulcanization for 60 minutes at 145° C., the compound had a tensile strength of 2025 lbs.; elongation of 370%; modulus (300%) of 1770 lbs.; permanent set of 31%; and T–50 value of +21° C.

Example VIII

Alpha-methyl styrene, 45 parts, is co-polymerized with 55 parts of a mixture of the dienes used in Example I under similar conditions. The resulting co-polymer is ideal as a packaging material.

Example IX

Styrene is used in place of alpha-methyl styrene in co-polymerization with the mixture of diene used in Example I. Proportions are as in Example VIII; polymerization and recovery as in Example I.

Example X

Alpha-methyl styrene, 5 parts, is co-polymerized with 95 parts of the mixture of dienes used in Example I. The co-polymerization is carried out in liquid ethylene at atmospheric pressure, using stannic chloride as a catalyst. A tough, rubbery polymer having a definite elastic limit is obtained.

The term "polymerization" is used herein in a generic sense to cover the polymerization of a single monomeric polymerizable compound, or the simultaneous polymerization of two or more different monomeric polymerizable substances. The polymerization of a single monomeric substance is termed "homopolymerization" and the polymer so produced is designated as a "homopolymer." The term "elastomer" is used in accordance with the proposal of H. L. Fisher, Ind. Eng. Chem., 31, 941 (1939).

We claim as our invention:

1. A process of producing an elastomer having improved milling properties comprising co-polymerizing from about 0.1% to about 5% of alpha-methylstyrene with from about 99.9% to about 95% of a mixture of 2-methyl-1,3-pentadiene and 4-methyl-1,3-pentadiene at a temperature of below 75° C. in the presence of a Friedel-Craft catalyst.

2. An elastomer consisting of from 0.1% to 5% of alpha-methylstyrene with from 99.9% to 95% of a mixture of 2-methyl-1,3-pentadiene and 4-methyl-1,3-pentadiene.

3. An elastomer consisting of from 0.1% to 5% of styrene with from 99.9% to 95% of a mixture of 2-methyl-1,3-pentadiene and 4-methyl-1,3-pentadiene.

4. An elastomer consisting of from 99.9% to 95% of a methyl-1,3-pentadiene with from 0.1% to 5% of an alkenylaryl hydrocarbon of the group consisting of styrene, alpha-methylstyrene and vinylnaphthalene.

5. A copolymer consisting of from 99.9% to 90% of methyl-1,3-pentadiene with from 0.1% to 10% of an alkenylaryl hydrocarbon of the group consisting of styrene, alpha-methylstyrene and vinylnaphthalene.

6. A copolymer consisting of from 0.1% to 10% of alpha-methylstyrene with from 99.9% to 90% of methyl-1,3-pentadienes.

7. A copolymer consisting of from 0.1% to 10% of styrene with from 99.9% to 90% of methyl-1,3-pentadienes.

8. A process which comprises copolymerizing from 0.1 to 10 parts of styrene with from 99.9 to 90 parts of a methy-1,3-pentadiene at a temperature below 75°, in the presence of a Friedel-Crafts catalyst.

9. A process which comprises copolymerizing at a temperature below 75° C, in the presence of a Freidel-Crafts catalyst, from 99.9 to 90 parts of a methyl-1,3-pentadiene with from 0.1 to 10 parts of an alkenylaryl hydrocarbon of the group consisting of styrene, alpha-methylstyrene and vinylnaphthalene.

RUPERT C. MORRIS.
ALVA V. SNIDER.
EUGENE T. BISHOP.

REFERENCES CITED

The following references are of record in the file of this patent:

UNITED STATES PATENTS

| Number | Name | Date |
|---|---|---|
| 1,898,522 | Bock | Feb. 21, 1933 |
| 1,938,731 | Tschunker | Dec. 12, 1933 |
| 2,327,705 | Frolich | Aug. 24, 1943 |
| 2,362,052 | Craig | Nov. 7, 1944 |
| 2,391,817 | Blackburn | Dec. 25, 1945 |

FOREIGN PATENTS

| Number | Country | Date |
|---|---|---|
| 106,371 | Australia | Jan. 26, 1939 |
| 115,688 | Australia | Aug. 20, 1942 |
| 278,486 | Germany | May 24, 1913 |